United States Patent [19]
van Leeuwen et al.

[11] Patent Number: 6,012,691
[45] Date of Patent: Jan. 11, 2000

[54] UNIVERSAL BEAM HANGER

[75] Inventors: Martin van Leeuwen, Tilburg; Gerardus E. C. van Gijsel, Goirle, both of Netherlands

[73] Assignee: Erico International Corporation, Solon, Ohio

[21] Appl. No.: 08/834,910

[22] Filed: Apr. 7, 1997

Related U.S. Application Data

[60] Provisional application No. 60/015,046, Apr. 9, 1996.

[51] Int. Cl.[7] .................................................. A47B 96/06
[52] U.S. Cl. ......................... 248/228.3; 248/58; 248/62
[58] Field of Search ..................... 248/228.1, 228.3, 248/228.5, 228.6, 72, 58, 62, 65, 68.1, 70, 73, 74.1, 300, 316.4, 316.1, 316.6, 59, 327, 323, 339, 340, 342, 228.7, 413, 354.6, 297.31; 24/528; 108/3, 36

[56] References Cited

U.S. PATENT DOCUMENTS

| | | | |
|---|---|---|---|
| Re. 26,247 | 8/1967 | Tinnerman | 248/72 |
| 618,603 | 1/1899 | Henneman | 248/59 |
| 631,887 | 8/1899 | Clark | 248/62 X |
| 702,704 | 6/1902 | Carll | 248/62 X |
| 709,816 | 9/1902 | Collins | 248/228.3 |
| 769,746 | 9/1904 | Hewlett | 248/72 |
| 826,161 | 7/1906 | Hayden | 248/72 X |
| 893,378 | 7/1908 | Rosenfeld | 248/228.3 |
| 989,808 | 4/1911 | Rockwood et al. | 248/228.3 |
| 1,281,531 | 10/1918 | Dietrich | 248/228.5 |
| 1,662,539 | 3/1928 | Schmidt | 248/228.3 X |
| 2,206,328 | 7/1940 | Martinek | 248/340 X |
| 2,608,766 | 9/1952 | Thein | 248/288.11 |
| 2,925,238 | 2/1960 | Lynott | 248/297.31 |
| 3,053,494 | 9/1962 | Stoll | 248/228.3 |
| 3,233,297 | 2/1966 | Havener . | |
| 3,995,823 | 12/1976 | Hensel | 248/327 |
| 4,765,577 | 8/1988 | Collins et al. | 248/59 |
| 4,834,186 | 5/1989 | Ballard | 248/74.1 X |
| 5,460,415 | 10/1995 | Lengauer et al. . | |
| 5,482,240 | 1/1996 | Caraher | 248/327 X |
| 5,695,164 | 12/1997 | Hartmann et al. | 248/316.4 |

OTHER PUBLICATIONS

Erico Products, Inc., Caddy fasteners for the construction industry, Products Catalog, all pages, Mar. 1973.
Hungarian Search Report dated Jul. 3, 1998, for Hungarian Patent Application No. P9700726.
Erico Fixing Products Catalog, 1988, p. 41–48.
Sinard Catalog, date unknown, page number unknown.
catalog page, date unknown, page unknown, pictures are self–explanatory.

*Primary Examiner*—Ramon O. Ramirez
*Assistant Examiner*—Stephen S. Wentsler
*Attorney, Agent, or Firm*—Renner, Otto, Boisselle & Sklar, P.L.L.

[57] ABSTRACT

A simplified universal beam hanger suitable for concrete and steel beams, includes a pair of L-shape members each having notched vertical legs and horizontal legs. Adjustable spring clips fit on the notched vertical legs and project inwardly to bear on a portion of the beam. The clips have spread or angularly related spring legs and each has a hole which will telescope over the notched vertical leg only when each of the spring legs are pressed toward [a position] one another such that each of the spring legs are positioned generally normal to the vertical leg of the L-shape members. The clip has a bearing fulcrum which requires the load to be relieved before both legs of the clip can be pressed together and any vertical adjustment made. The horizontal legs of the L-shape members telescope into a housing beneath the beam and are maintained parallel and adjacent each other. The housing is formed from a single piece of sheet metal and has a clamp and confining windows at each end. One or more loads may be suspended therefrom as by threaded rod or wire, or supported at the side of the beam. The hanger is thus quickly adjustable for substantially any beam configuration, both concrete and steel.

26 Claims, 4 Drawing Sheets

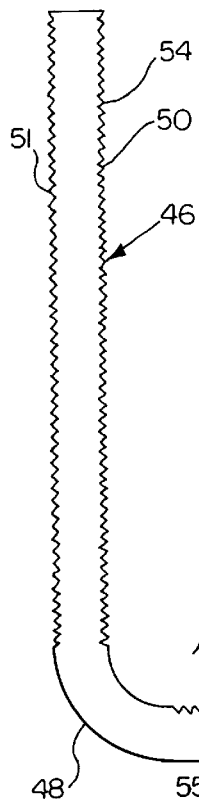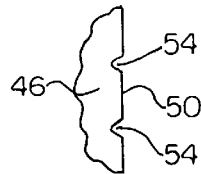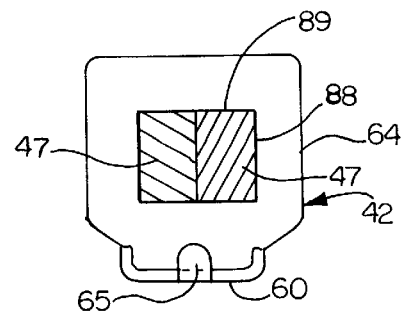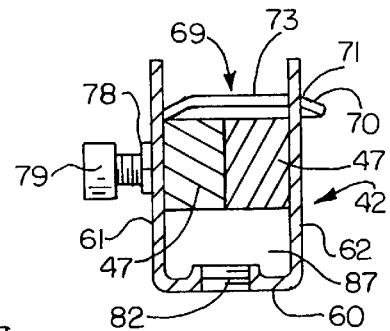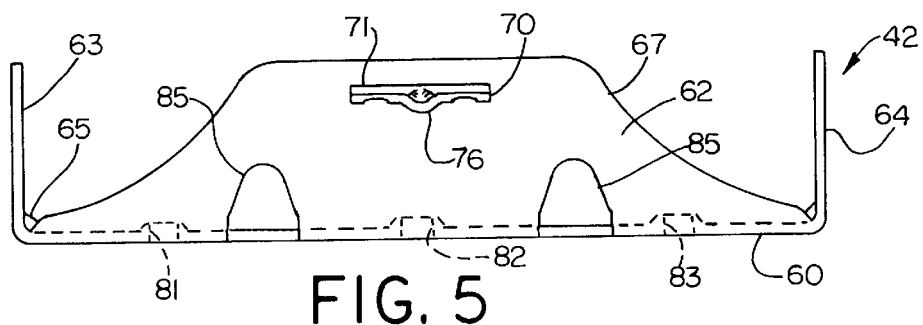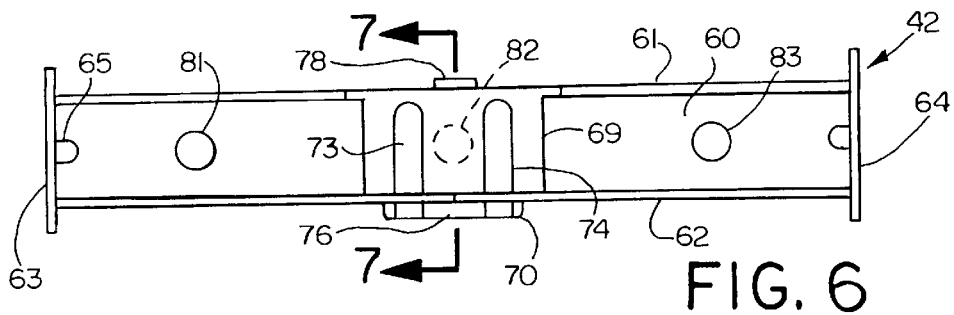

UNIVERSAL BEAM HANGER

This application claims the priority of U.S. Provisional Application Serial No. 60/015,046, filed Apr. 9, 1996.

DISCLOSURE

This invention relates to a universal beam hanger and more particularly to an adjustable hanger, particularly suited for suspending a wide variety of loads such as pipes, cable trays, lighting or the like from the underside of steel or concrete beams.

BACKGROUND OF THE INVENTION

Concrete beams or purlin supports are becoming common in building construction where materials and casting yards are locally available. The use of precast concrete beams or purlins is in many areas becoming competitive with steel or wood. The free span of the beams may vary widely from say 5 to 50 meters, as do the size and dimensions of the cross section. For weight, stiffness and strength reasons, the beams are usually always in the form of an I. That is, they have a vertical stem or web and top and bottom flanges. The flanges, and particularly the lower flange, usually have the highest concentration of steel reinforcing and some of such steel may be quite close to the surface of the concrete.

Such precast beams used to be significantly overdesigned with an excess of steel and dimension. However, to reduce weight and to be competitive with comparable span steel and wood beams, slender more carefully designed precast concrete beams are employed, and such beams are not always capable of having holes or anchors inserted into them without compromising the integrity and design strength of the beam. More and more by code or regulation, drilling or inserting fasteners into steel reinforced concrete beams is forbidden. This is particularly true in the lower flange which may have a high concentration of critical steel close to the concrete surface. Moreover, the precise location of the steel is not always known, and because of tolerances involved in the casting process may vary somewhat from beam-to-beam, even though of identical exterior dimension and design capacity.

In the past, some fastening techniques have utilized a hole through the web in the area of the neutral axis of the beam. Such techniques may involve angle brackets fastened to the web through the hole and projecting laterally from the beam. Other systems simply wrap metal strap through a hole or slot in the web around the lower flange. Others may use a large inverted U-bolt extending through the web hole to hold a channel or strut to the bottom of the beam, from which the load is suspended. In the lower flange, it was common to drill a hole and insert an anchor to secure a channel or rail which in turn suspended the load. These methods, now mostly prohibited or frowned upon because of possible compromise of beam strength, were also messy and labor intensive to accomplish properly. Even if the holes or systems are precast or cast in place, this adds to the cost of the beam and even so they usually require cleaning or removal of concrete intrusions.

Also, the hole, whether in the web or lower flange, once formed has no adjustability longitudinally of the beam. Such holes, particularly in the web, negatively affect the appearance of the beam. More importantly, such holes, particularly in the bottom flange, introduce local forces where the beam is most vulnerable.

A variety of hanging systems avoid the beam hole problem by completely encircling the beam. This can be done with a perforated metal strap or strip completely around the beam, or with a large inverted U-bolt or threaded rod going over the top of the beam, and holding a channel to the bottom of the beam from which a load is suspended Another system may use parallel struts, one over the top of the beam and one below the beam, such struts being interconnected with threaded rod on each side of the beam. Such threaded rod usually requires a multiplicity of nuts and washers and they have to be adjusted or tightened evenly. These systems are useful only if the area over the beam is accessible, and even then require a large number of parts and adjustments. The latter is true since the parts involved are not readily adjustable other than by cutting to obtain an optimal fit for different size or shape beams.

Because of the shortcomings of the above systems, there has evolved some tailored systems designed to grip only the exterior of the bottom flange. These systems are relatively costly and have a limited range of beam sizes and configurations on which they will work. The simplest system uses a horizontal strut which extends beneath the beam. Brackets are mounted to extend from the top of the strut at each edge of the bottom flange. The brackets terminate in inwardly inclined upper ends which extend over the top of the edges of the beam bottom flange. The brackets, however, usually fit only one size or type of beam and problems are encountered if the flange dimensions may vary even slightly longitudinally of the beam. The load is usually suspended from the strut and special holes in the strut may be required for the brackets, and certainly the right size and shape brackets. Again, multiple nuts, bolts and washers are required. The hanging system is difficult to fit securely and snugly. The brackets and the spacing of the brackets still have to be tailored for a particular beam or a very narrow range of beams.

In a steel beam, clamps are used over the edge of the bottom flange, but the configuration and size of concrete beams makes application bulky, limited and awkward.

A more complex tailored hanger is that sold by SINARD and known as the REF-500. It includes two main brackets horizontally adjustable by use of a thumb screw extending beneath the beam. Each bracket includes a short vertical leg. At the top of each leg is pivoted a short obtuse angle double roller bracket. The lower roller is designed to contact the side or edge of the flange forcing the upper inwardly offset roller to pivot over the top of the flange until it contacts the sloping upper surface of the lower beam flange, all as the two main brackets are tightened about the flange with the thumb screw. Such hanger is relatively complex and expensive and depends on the strength of both the main and roller brackets for its load capacity Moreover, its range of applicable beams, sizes and shapes is limited.

It would, accordingly, be desirable to have a simplified universal beam hanger which does not have to circle the beam completely, which does not need a hole or strut in the beam, and which has wide adjustability to accommodate a wide variety of beam sizes and shapes and which can be used on both concrete and steel beams. It would also be desirable to have such a hanger using few low cost and easy to install, assemble, and operate parts.

SUMMARY OF THE INVENTION

A universal beam hanger for concrete and steel beams, includes two main structural members rectangular in section. Each member may in some forms be identical and L-shape and includes a vertical leg and a somewhat longer horizontal leg with a bend radius at the corner. The interior and exterior (inside the bend and outside the bend) of the vertical leg are provided with closely spaced notches, as is the top of the horizontal leg. The horizontal legs go beneath the beam while the vertical legs go upwardly on each side of the beam. Mounted on each vertical leg is an inwardly extending spring clip. Each clip has two angularly related legs with a slightly oversize rectangular hole. When angularly related, the opposite narrower edges of the holes bite into the vertical leg to keep the clip from moving vertically along the leg. Each clip includes a downwardly offset bearing nose or fulcrum adapted to engage the top surface of the bottom beam flange. The notches in the leg vertical section enhance the biting action of the sharp hole edges of the hardened spring clip. The clip can be vertically adjusted or moved along the vertical leg sections by squeezing the legs together so that both extend generally normal to the leg. In such position, there is sufficient clearance at the holes to permit vertical movement of the clip along the vertical leg. A stiffening insert may be positioned within the clip before loading to maintain the angular relationship of the legs, the insert also reinforcing the downwardly offset bearing nose.

The horizontal sections of the structural L-shape members extend adjacent to each other beneath the beam. Such sections telescope through a housing, and when properly adjusted, are clamped to each other and the housing. The housing has windows at each end which have frame edges which engage the notches in the horizontal legs resisting longitudinal slip. The housing has substantial lateral support for the structural members to resist any tendency to pivot about the clip fulcrum under load. The housing may be fabricated from a single sheet of metal and the load is hung from the housing at one or more locations as by threaded rod or wire.

In some embodiments, the horizontal sections of the structural members may be provided with interfitting teeth as they face each other side-by-side and are clamped to each other and the housing. Such teeth may take the form of rack teeth extending the full height of the horizontal section, or a row of alternating teeth and sockets.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 3 is an enlarged elevation partially broken away of the L-shape bar;

FIG. 4 is an enlarged fragmentary detail of the notches on both the inside and outside of the vertical section and the top of the horizontal section;

FIG. 5 is the side elevation of the housing;

FIG. 6 is a top plan view of the housing;

FIG. 7 is a vertical section taken on the line 7—7 of FIG. 6;

FIG. 8 is an end elevation of the housing showing the window;

DETAILED DESCRIPTION OF THE PREFERRED EMBODIMENTS

Figure 1:
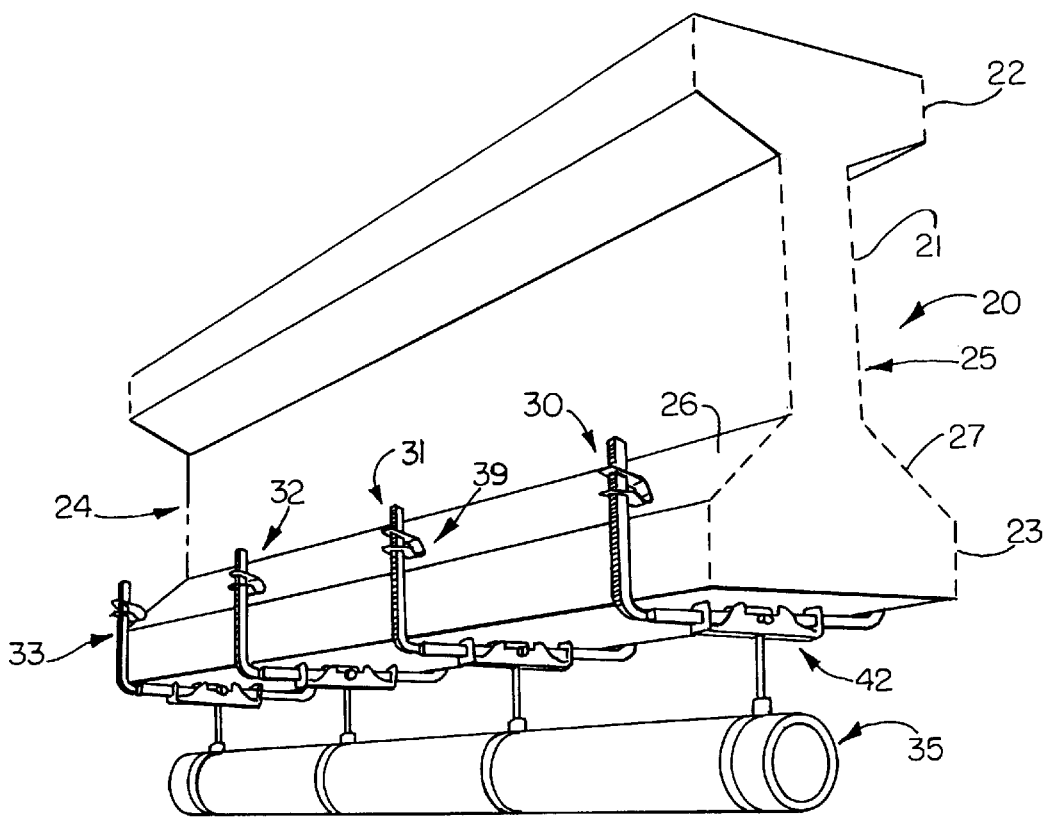
FIG. 1 is a perspective view of the universal hangers of the present invention applied to a concrete beam and supporting a pipe.

Referring initially to FIG. 1, there is illustrated generally at 20 in phantom lines, a reinforced concrete beam. The beam includes a relatively narrow midsection or web 21 and top and bottom flanges shown generally at 22 and 23, respectively. It is the upper and lower flanges 22 and 23 which normally contain the steel reinforcing in significant quantities. The usual configuration of the I beam illustrated includes two side notches shown generally at 24 and 25 which are formed by the top and bottom flanges. The notches include a generally outwardly sloping projecting shelf as seen at 26 and 27, respectively. It is from these shelves at the top edges of the bottom flange that hangers of the present invention shown generally at 30, 31, 32, and 33 are hung. In FIG. 1 the hangers are illustrated supporting a pipe 35 running longitudinally beneath the beam.

Figure 2:
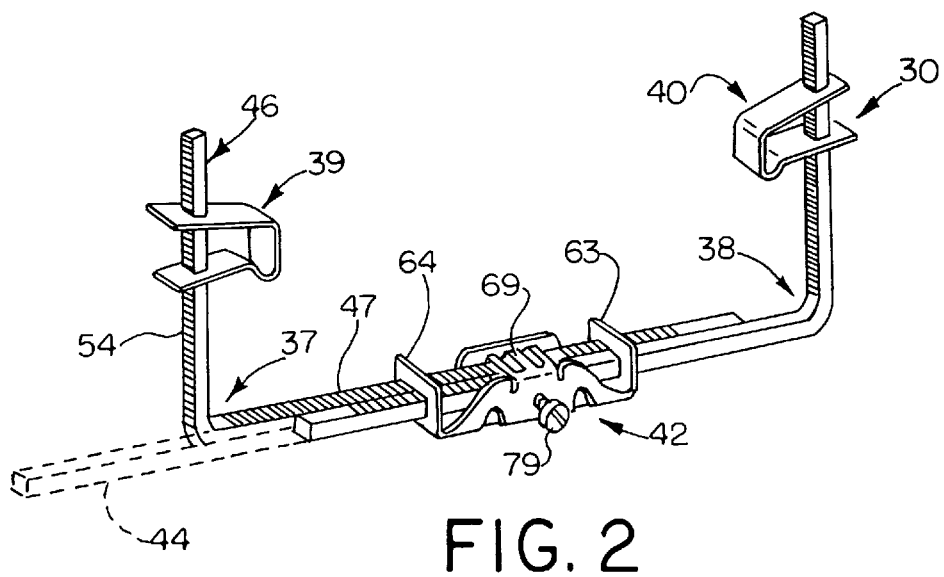
FIG. 2 is an enlarged perspective view of the hanger assembly without the beam.

A hanger 30 shown in better detail in FIG. 2 includes substantially identical structural L-shaped members seen at 37 and 38, respective vertically adjustable spring clips 39 and 40, and a housing, shown generally at 42. These are the basic elements of the hanger and in many forms, items 37 and 38 will be identical to each other as are the items 39 and 40. However, in some embodiments as hereinafter described, one or both of the L-shaped members may have a longer horizontal leg as seen in phantom lines at 44 in FIG. 2.

Referring now additionally to FIGS. 3 and 4, it will be seen that each L-shaped structural member includes a vertical leg 46 and a horizontal leg 47, with a radius 48 therebetween. The structural L-shaped members may be formed from rectangular bar stock or relatively thick walled tubular stock and are structurally rigid. The horizontal leg 47 may be somewhat longer than the vertical leg 46. The dimensions of the two legs of the L-shaped members are designed to accommodate a wide variety of shapes and sizes of generally I-shaped concrete and steel structural beams or purlins.

As indicated in FIGS. 2–4, the interior surface of the vertical leg indicated at 50, the exterior surface of such vertical leg indicated at 51, and the top or interior surface of the horizontal leg seen at 52 each include a series of fairly closely spaced notches 54. The bottom of the horizontal leg may be provided with equally spaced indices at a location indicated at 55 much as a ruler enabling the installer to set the position of the leg with respect to the housing 42.

As seen more clearly in FIG. 4, the evenly spaced small notches may be spaced approximately 2 millimeters from each other and may be approximately 1/3 millimeter deep. The notches extend transversely completely across the surface in which they are formed. The notches extend accordingly at right angles to the longitudinal extent of the structural member leg surfaces. In the vertical leg, the notches may extend from the top of the vertical section to the tangent with the radius 48. The notched top surface of the horizontal leg 47 extends through the housing 42.

Referring now additionally to FIGS. 5, 6, 7, and 8, it will be seen that the housing 42 is preferably formed of a single sheet of metal and includes a bottom 60, upturned side walls 61 and 62, and upturned end windows 63 and 64 which are laterally enlarged. The folds between the base or bottom 60 and the end windows may include a formed gusset seen at 65.

The side walls have the upper truss-shaped profile edge seen at 67. The side wall 61 however, includes a horizontal projection shown generally at 69. The horizontal projection includes a tip 70 which fits through horizontal slot 71 in the wall 62. The projection 69 may include stiffening ribs seen at 73 and 74. When the horizontal projection 69 extending from the side wall 61 is inserted through the slot 71, the projection is deformed downwardly as indicated at 76 in FIG. 5 to lock the projection in the slot.

The side wall 61 is provided with an extruded internally threaded hole seen at 78 in which is threaded a clamp screw 79. The bottom of the housing is provided with three extruded and tapped openings seen at 81, 82, and 83. Such tapped holes accommodate vertically extending threaded rod for application of a variety of hanging systems. It is also noted that the side walls of the housing are provided with fairly substantial holes seen at 85 which may be used in connection with wire hanging systems.

Referring now to FIGS. 7 and 8, it will be seen that the housing is such that the two horizontal legs 47 of the L-shaped structural members telescope through the housing and through each window side-by-side. As seen in FIG. 7, there is substantial space 87 between the threaded holes 81, 82, and 83 and the underside of the horizontal legs. However, with regard to the windows, there is little clearance provided between the window opening 88 and the horizontal leg, and the top edge 89 of the window opening is designed to engage or bite into the notches on the top of the legs when the hanger is loaded. This engagement helps the clamping of the legs to the housing, as does the tightening of the clamp screw 79. When the clamp screw is not tightened, the horizontal portion of the legs and the housing may move with respect to each other for adjustment.

Figure 9:
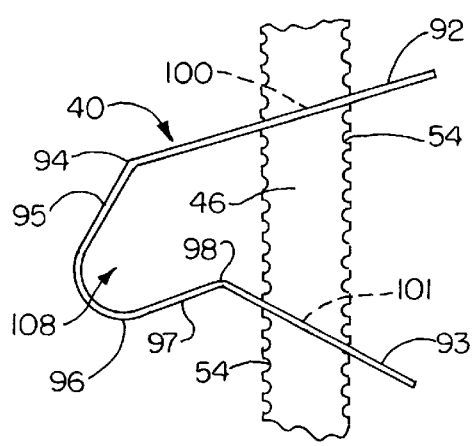
FIG. 9 is a fragmentary enlarged side elevation of the adjustable spring clip.
Figure 10:
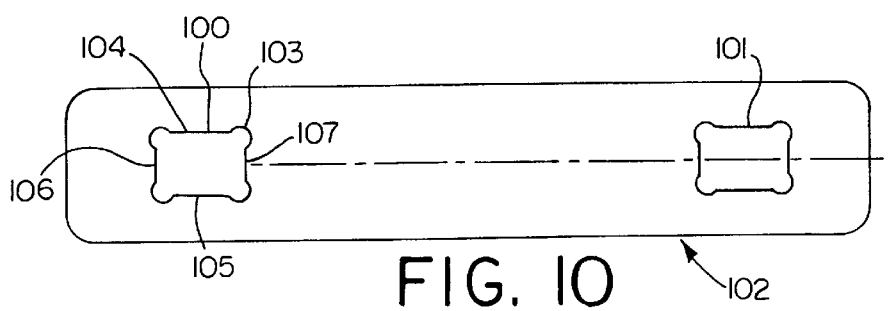
FIG. 10 is a plan view of the spring clip blank showing the formation and location of the leg receiving holes.

Referring now to FIGS. 2, 9, and 10, it will be seen that the spring clip members 39 and 40 are identical and each includes an upper leg 92 and a lower leg 93 which are normally angularly spread or separated in the unbiased condition of the spring member as seen in FIG. 9. The upper leg 92 includes an obtuse or elbow bend 94 which then causes the leg to extend downwardly at 95 sloping to a rounded nose section 96. The nose section continues and extends upwardly at an angle indicated at 97 to another obtuse corner bend 98 from which the leg 93 extends. Each leg is provided with a generally rectangular hole seen at 100 and 101. The configuration of the holes is seen more clearly in FIG. 10 which illustrates the blank 102 from which the spring member is formed.

Each rectangular hole is elongated in the direction of elongation of the blank and includes radiused corners indicated at 103. Such radii avoids notching and causes the four sides of each rectangular hole to project inwardly slightly as teeth. The two longer dimensioned sides of the hole seen at 104 and 105 are spaced slightly wider than the width of the structural member. Also, the more narrow edges seen at 106 and 107 are spaced somewhat further than the somewhat longer dimension of the rectangular structural members. The structural member will telescope through each hole most easily if the structural member extends at approximately a right angle to the plane of the hole. At an angle to the hole, the edges 106 and 107 bite into the metal of the structural member, such biting engagement being enhanced by the notches 54. The edges of each hole are in effect formed as hardened teeth to bite into and engage the inside and outside of the vertical legs of each structural member when the leg of the spring member is at any significant angle with respect to the structural member. With a downward force on the vertical leg, the nose 96 engages the surface 26 or 27 of the concrete beam 20 causing the lower leg of the spring member to cant or extend to an even greater angular extent with respect to the vertical leg locking the spring member to the vertical leg. In order to permit telescoping adjustment between the vertical leg and the spring member, the legs have to be squeezed together or brought towards such generally horizontal position so that the holes have sufficient clearance to permit telescoping over the vertical portion of the structural member. The spring member is locked in place simply by releasing the legs to permit them to spring apart. The nose 96 under load acts as a fulcrum to maintain locking angular relationship between the spring leg and the structural member vertical leg. The load thus has to be relieved before the spring legs can be brought perpendicular to the structural member vertical leg.

Figure 11:
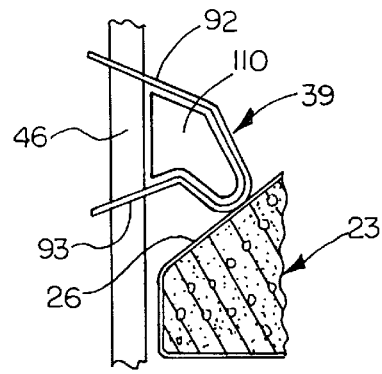
FIG. 11 is a fragmentary side elevation of an optional insert positioned within the spring clip after it has been installed.
Figure 12:
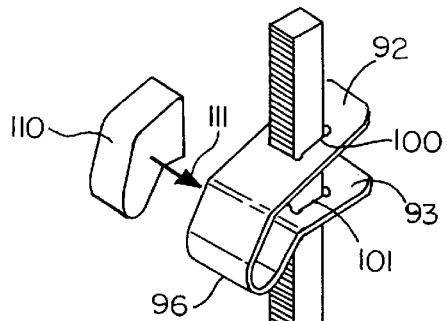
FIG. 12 is a fragmentary perspective view showing how the insert is installed.

Referring now additionally to FIGS. 11 and 12, there is illustrated a modification of the present invention which may be utilized with heavy loads. The spring member forms an opening 108 as shown in FIG. 9 when the legs are spread and prior to any significant loading. In such position the opening edges are in engagement with the notched surfaces of the vertical leg. In order to resist deformation of the spring, an insert shown at 110 may be inserted in such opening simply by sliding it into the opening in the direction of the arrow 111 in FIG. 12. The insert is shaped as is the opening and may be formed as a solid plastic or fabricated metal block which simply snaps into the hollow 108 of the spring. Once loaded, it will remain in place. The insert prevents excessive or permanent deformation in the case of heavy loads. Once loaded, the spring clip member acts as a stiff triangle which is an excellent load bearing configuration. The stiff insert enhances this load bearing capacity.

Figure 13:
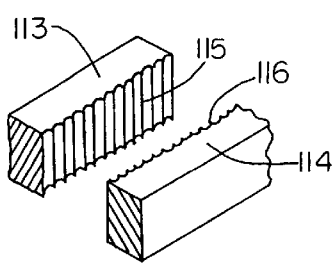
FIG. 13 is a perspective view of a modified form of horizontal leg where the inside faces are provided with meshing teeth when clamped together at the housing.
Figure 14:
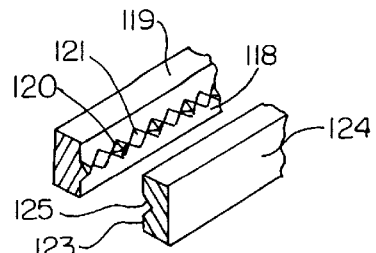
FIG. 14 is a fragmentary perspective of yet another form of leg wherein the inside faces are each provided with a row of alternating pyramidal teeth and recesses which mate when clamped together at the housing.

Referring now to FIGS. 13 and 14, in order to enhance the locking together of the two horizontal leg sections within the housing 42, the interior facing faces may be provided with intermeshing teeth. In FIG. 13 the opposed horizontal leg sections are shown at 113 and 114 and each has an interior facing face provided with teeth shown respectively at 115 and 116 which run the full height of the leg horizontal section. The teeth 115 and 116 will mesh locking the two horizontal leg sections against both longitudinal relative slippage and misalignment. The teeth illustrated in FIG. 13 are like the teeth of a rack and have a profile which permits the two horizontal leg sections to telescope with respect to each other within the housing when not tightened, but when tightened the two leg sections are locked together.

FIG. 14 illustrates another version of the meshing interior faces of the horizontal leg sections for the same purpose. In FIG. 14 the interior face 118 of horizontal leg section 119 is provided with a central horizontal row of alternating pyramidal teeth projections 120 and corresponding sockets 121. The interior face 123 of the horizontal leg section 124 is provided with a mating row of teeth and sockets 125 which mesh and lock together with the opposed row when the horizontal leg sections are clamped interior face-to-interior face. Both forms of interior meshing faces may be used with or without the notches in the horizontal top surface of each horizontal leg.

Figure 15:
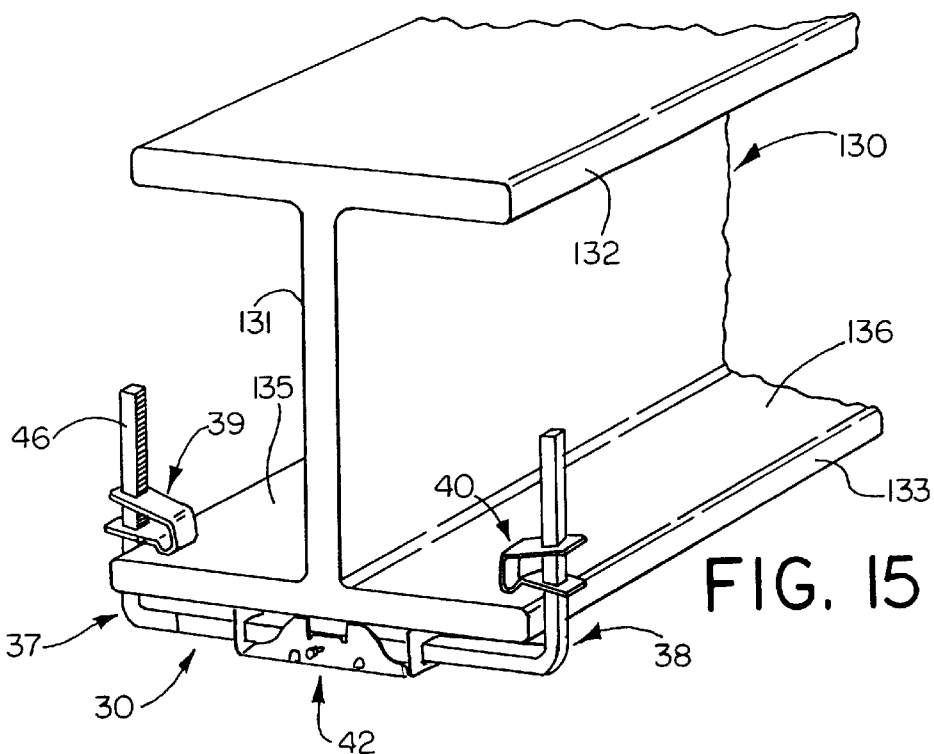
FIG. 15 is a view like FIG. 1 showing the hanger applied to a steel beam.

Referring now to FIG. 15 there is illustrated a steel beam shown generally at 130. This steel beam is again an I-beam which includes a center web 131 separating top and bottom flanges 132 and 133. The hanger is shown generally at 30 and the clips 39 and 40 engage the horizontal shelves 135 and 136 formed by the lower flange. Accordingly, the hanger of the present invention will fit not only a wide variety of concrete beams but also steel beams.

Figure 16:
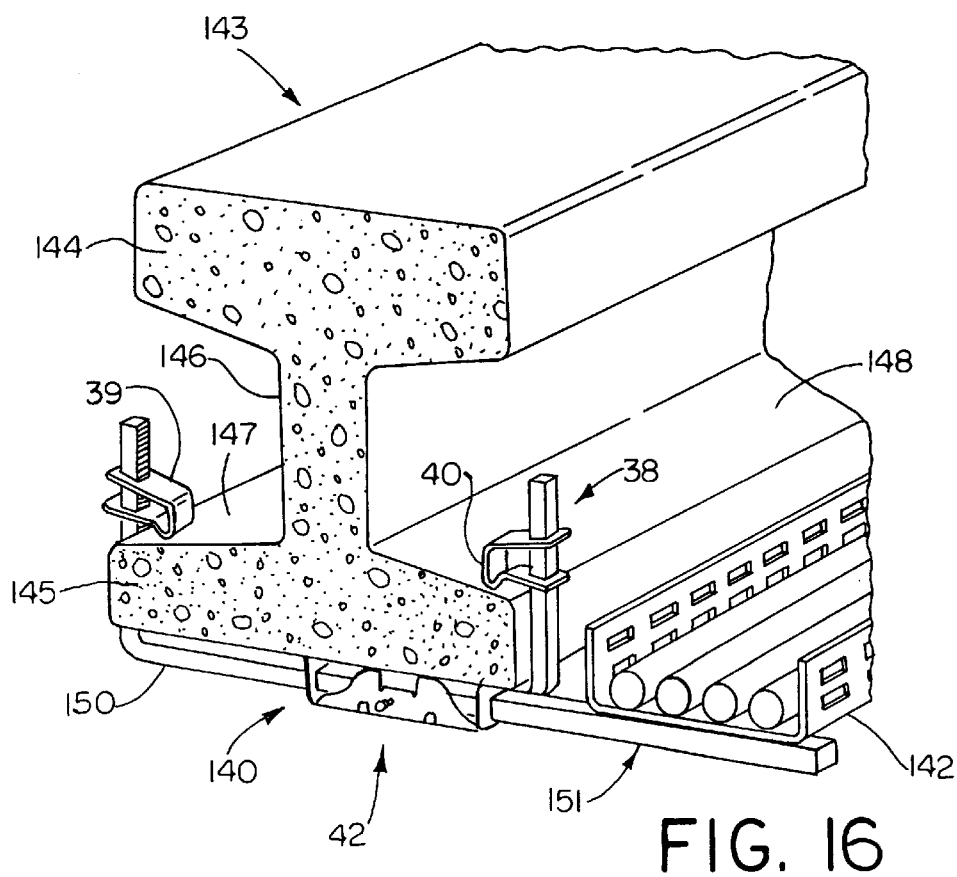
FIG. 16 is a similar view showing a modified form of the hanger with the horizontal leg of one of each pair extended and supporting a cable tray, for example, at the side of a concrete beam.

Referring now to FIG. 16 there is illustrated a hanger in accordance with the present invention shown generally at 140 supporting a cable tray 142 at the side of concrete beam 143. The concrete beam includes top and bottom flanges 144 and 145 with web 146 therebetween. The bottom flange forms the shelves 147 and 148 from which the hanger 140 is suspended. The hanger 140 is the same as the hanger 30 except that the left hand structural member shown at 150 has a longer horizontal leg 151. The leg 151 thus projects laterally beyond the beam and the bottom flange 145 and may support, for example, the cable tray 142 illustrated. It is also noted that the housing 42 has been positioned towards the edge of the bottom beam flange 148 to reduce the cantilever moment of the load. It is this embodiment which is illustrated in phantom lines at 44 in FIG. 2. It will be appreciated that by extending both the horizontal legs, the hanger may support loads at both sides of the beam.

It can now be seen that there is provided a universal beam hanger which can quickly be tailored to fit a wide variety of beam configurations both concrete and steel. The hanger is a low cost readily adjustable hanger for suspending a wide variety of loads from the lower flange of a beam, whether that beam be steel or concrete, and if concrete without violating the integrity of the beam structure.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A beam hanger for a beam comprising a pair of L-shape members each having a vertical leg and a horizontal leg, said horizontal legs capable of abutting one another and being adapted to extend horizontally beneath the beam parallel to and adjacent each other while the respective vertical legs extend upwardly on each side of the beam, each of said vertical legs including a vertically adjustable inward projection for extending above at least a portion of the beam, and a housing for positioning beneath the beam through which both said horizontal legs extend in telescope fashion to maintain said horizontal legs parallel to each other, and means operative to hang a load from said housing.

2. A hanger as set forth in claim 1 including means adjustably to clamp said horizontal legs together and to said housing whereby said hanger is adjustable as to the spacing of said vertical legs.

3. A hanger as set forth in claim 2 wherein said inward projections are spring clips independently vertically adjustable along the respective vertical leg.

4. A hanger as set forth in claim 1 wherein said means operative to hang a load from said housing includes a bottom wall having a threaded opening therein for receiving a threaded hanger rod.

5. A hanger as set forth in claim 1 wherein said housing has opposite ends, and leg conforming window frames at each end, and side walls between said ends, and means to clamp said housing to said horizontal legs between said side walls.

6. A hanger as set forth in claim 5 wherein said housing is formed from a single piece of sheet metal which includes a tab and a slot which interfit when formed.

7. A hanger as set forth in claim 6 wherein said tab includes a tab deformation adjacent the exterior of said slot to prevent the tab from withdrawing through the slot.

8. A hanger as set forth in claim 5 including notches on said horizontal legs operative to engage the window frames.

9. A hanger as set forth in claim 5 wherein said means to clamp comprises a clamp screw, and said horizontal legs extend side-by-side through said housing and said window frames, each horizontal leg having a facing surface clamped together by said clamp screw.

10. A hanger as set forth in claim 9 including teeth on each said facing surface meshing when said facing surfaces of said legs are clamped together.

11. A hanger as set forth in claim 10 wherein said teeth extend the full height of the facing surface of said legs.

12. A hanger as set forth in claim 10 wherein said teeth are formed in a horizontal row and alternate with sockets matching and surrounding the teeth in the opposite leg face.

13. A hanger as set forth in claim 1 wherein said legs are formed of rectangular stock having an inner and outer surface, and said inner and outer surface of each vertical leg is provided with closely spaced notches.

14. A hanger as set forth in claim 1 wherein each inwardly extending projection is in the form of a spring clip, each spring clip having angularly related spring legs, each leg having a rectangular hole which will telescope over the vertical leg of the respective L-shape member only when the legs of said clip are forced toward a position perpendicular to the vertical leg.

15. A hanger as set forth in claim 14 wherein each spring clip includes a downwardly extending bearing nose adapted to engage the beam.

16. A hanger as set forth in claim 14 wherein each clip includes a load bearing fulcrum adapted to engage the beam requiring a load on the hanger be relieved before the legs of the clip can be brought perpendicular to the vertical leg of the L-shape member.

17. A hanger as set forth in claim 14 including an insert positioned between the legs of said clip to maintain the angular relationship of the legs.

18. A hanger as set forth in claim 1 wherein the horizontal leg of one of said L-shape members is longer than the horizontal leg of the other L-shape member and is long enough to project laterally of the beam to support a load at the side of the beam.

19. A beam hanger for a structural beam comprising a pair of fixed vertical legs, said fixed vertical legs being adapted to extend upwardly on respective opposite sides of the structural beam, each of said vertical legs having an inward projection coupled thereto and extending horizontally inwardly from the respective fixed leg toward the other fixed leg for extending above and overlying at least a portion of the structural beam, each inward projection is made of a single piece of formed sheet metal having a uniform thickness and being bent to define an open center facing an inner surface of the respective fixed leg, each said inward projection including means operative independently to adjust each said horizontal inward projection along substantially the entire vertical height of the respective vertical leg, and spanning means for extending horizontally beneath the beam from one opposite side to the other opposite side of the beam, and for fixing both said vertical legs, and means operative to hang a load from said spanning means beneath the structural beam.

20. A beam hanger as set forth in claim 19 wherein said means extending horizontally beneath said beam comprises a housing, and a threaded rod and connection operative to hang a load from said housing.

21. A hanger as set forth in claim 19 wherein the means for extending horizontally beneath the beam includes horizontal legs each integrally formed with the respective vertical legs, and a housing connecting the horizontal legs.

22. A hanger as set forth in claim, 19 wherein the means operative to hang a load includes a vertically-oriented threaded connection for receiving a threaded rod.

23. A hanger as set forth in claim 19 wherein each horizontal inward projection includes an upper leg and a lower leg, the upper and the lower legs each having a hole therein, the legs being part of the means operative to adjust.

24. A hanger as set forth in claim 23 wherein each projection includes a downwardly extending outer rounded nose adapted to engage a portion of the beam, the nose being between the upper leg and the lower leg along the projection.

25. A hanger as set forth in claim 23 wherein the vertical legs extend upwardly through the respective holes in the horizontal inward projections.

26. A beam hanger for a structural beam comprising a pair of vertical legs, said respective vertical legs being adapted to extend upwardly on opposite sides of the structural beam; an inward projection coupled to each of said respective vertical legs for extending above and overlying at least a portion of the structural beam, said inward projections each being made of sheet metal and having an upper leg, a lower leg and a downwardly extending outer rounded nose between the upper leg and the lower leg along the projection, said nose adapted to engage a portion of the beam, said vertical legs passing through holes in the upper leg and the lower leg of said respective inward projections, said inward projections being vertically adjustable along said vertical legs; and means for extending horizontally beneath the beam, supported by both said vertical legs, and operative to hang a load from beneath the structural beam.

* * * * *